United States Patent
Lintulampi et al.

(10) Patent No.: US 6,711,406 B1
(45) Date of Patent: Mar. 23, 2004

(54) APPARATUS, AND ASSOCIATED METHOD, FOR FACILITATING RAPID MODE CHANGEOVER OF A MOBILE STATION

(75) Inventors: Raino Lintulampi, Kiviniemi (FI); Kari Jyrkkä, Oulu (FI); Heikki Päivike, Oulu (FI); Shavantha Kularatna, Irving, TX (US); Pekka Mottonen, Lewisville, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/564,160

(22) Filed: May 3, 2000

Related U.S. Application Data
(60) Provisional application No. 60/161,665, filed on Oct. 21, 1999, and provisional application No. 60/162,409, filed on Oct. 29, 1999.

(51) Int. Cl.[7] .................................................. H04Q 7/20
(52) U.S. Cl. ................................ 455/426.1; 455/552.1; 455/458; 370/352
(58) Field of Search ................................ 455/552, 567, 455/426, 445, 552.1, 426.1, 426.2, 553.1, 414.1, 422.1, 458; 370/352, 356, 338, 310.1, 310.2, 355, 354, 353

(56) References Cited

U.S. PATENT DOCUMENTS
5,978,367 A * 11/1999 Kinnunen et al. .......... 370/337
6,473,422 B2 * 10/2002 Hall et al. .................. 370/352

OTHER PUBLICATIONS
ETSI "Digital Cellular Telecommunications System; GPRS; MS–BSS Interface RLC/MAC Protocol" ETSI, 1999, Version 8.13.0; pp. 13, 44, 46, 47, 51, 52, 54, 55, 74, 76, 116, 281, 289, and 291.*
Rappaport "Wireless Communications" 1996, Prentice Hall, pp. 510–511.*

* cited by examiner

*Primary Examiner*—Nay Maung
*Assistant Examiner*—Tanmay Lele

(57) ABSTRACT

Apparatus, and an associated method, facilitates changeover of mode of operation of a mobile station operable in a cellular communication system. Changeover of the mode of operation of the mobile station is required when the mobile station is operated in the packet mode and a circuit-switched call is to be terminated at the mobile station. A page is transmitted to the mobile station which includes an allocation of time during which a response to a page forming a request to suspend the packet mode of operation is to be generated.

14 Claims, 3 Drawing Sheets

APPARATUS, AND ASSOCIATED METHOD, FOR FACILITATING RAPID MODE CHANGEOVER OF A MOBILE STATION

CROSS-REFERENCE TO RELATED APPLICATIONS

The present application claims priority of provisional application No. 60/161,665, filed on Oct. 21, 1999, and of provisional application No. 60/162,409, filed on Oct. 29, 1999.

The present invention relates generally to a manner by which to improve the page response time of a mobile station, such as a mobile station operable in a GSM (Global System for Mobile communications) cellular communication system. More particularly, the present invention relates to apparatus, and an associated method, for a radio communication system, such as the GSM system, to facilitate changeover of the mode of operation of the mobile station out of a packet mode, and into a circuit-switched mode, when a circuit-switched call is to be terminated at the mobile station. A packet paging request message is generated for transmission to the mobile station. The packet paging request message includes a time-allocation during which the mobile station is to return a response message upon a RaCH (Random access Channel).

BACKGROUND OF THE INVENTION

The use of wireless communication systems by which to communicate telephonically has achieved wide popularity in recent years. Telephonic communication, by way of various types of wireless communication systems, permits the communication of both voice and nonvoice data between sending and receiving stations of such communication systems.

As a wireline connection is not required to effectuate communication in a wireless communication system, improved mobility of communications in a wireless communication system, relative to communication by way of conventional wireline communication systems, is inherently possible. Because a wireless connection is formed, a wireline connection conventionally otherwise required in a wireline system is obviated, and movement of communication stations operable in a wireless communication system is, as a result, not limited by the need for a wireline connection.

A cellular communication system is exemplary of a wireless communication system which has achieved high levels of utilization. A cellular communication system is a multi-user communication system permitting large numbers of subscribers, i.e., users, to communicate telephonically through the use of mobile stations operable in such cellular communication systems.

Various types of cellular communication systems have been developed and implemented throughout large geographical areas. Some cellular communication systems permit the communication of non-real time messages, such as packet-formatted messages forming alphanumeric text. The GSM (Global System for Mobile communications) cellular communication system which provides for GPRS (General Packet Radio Service) messaging is exemplary of a system which permits the communication of non-real time messages. Two-way communication of packet data messages is provided in such a system. For instance, a packet data message originated at a communication station coupled to the network infrastructure of the GPRS/GSM system is communicated to the mobile station by way of the radio link formed therebetween. And, a packet data message originated at the mobile station is analogously communicated by the mobile station upon the radio link.

Conventional, circuit-switched communications are also effectuable in the GSM communication system. Circuit-switched calls can also be originated at either the mobile station or at a communication station coupled to the network infrastructure. For instance, a circuit-switched call originated at a communication station coupled to the network infrastructure is also effectuated by way a radio link formed with the mobile station. A protocol set forth in the specification of the GSM system sets forth a manner by which a call, originated at the network, is to be terminated at the mobile station. Namely, a paging signal is first sent to the mobile station to alert the mobile station of the call to be terminated thereat. And, subsequent exchange of signals results in the allocation of channels to permit thereafter the effectuation of the circuit-switched call Various facets of operation of a mobile station operable to communicate both packet-formatted data and circuit-switched communications differ depending upon which type of communications are effectuated with the mobile station. When the mobile station is being operated to communicate packet-formatted data, the mobile station is sometimes referred to as being in a packet mode of operation. And, when the mobile station is operated pursuant to a circuit-switched call, the mobile station is sometimes referred to as being in a circuit-switched mode.

When, for instance, the mobile station is in the packet mode, and a circuit-switched call is to be terminated at the mobile station, the mobile station must exit the packet mode, and thereafter enter the circuit-switched mode, prior to effectuation of the circuit-switched call.

Conventionally, when the mobile station is in the packet mode and a page is detected at the mobile station of a circuit-switched call to be terminated thereat, the mobile station must first suspend its operation in the packet mode in order to respond to the page, thereafter to permit a circuit-switched the page, the mobile station conventionally returns a request for a channel assignment. Upon detection at the network of the request for the channel assignment, the network assigns an uplink channel and sends an indication of the assignment to the mobile station. The mobile station then utilizes the allocated channel to send a packet suspend message back to the network.

This multi-step procedure is both time and resource consumptive. If a manner could be provided by which better to facilitate reassignment of the operational mode of the mobile station out of the packet mode and into the circuit-switched mode, improved system performance would result.

It is in light of this background information related to communications in a cellular, or other radio, communication system that the significant improvements of the present invention have evolved.

SUMMARY OF THE INVENTION

The present invention, accordingly, advantageously provides a manner for improving the page response time of a mobile station operable alternately in a packet mode and in a circuit-switched mode.

Through operation of an embodiment of the present invention, when the mobile station is operated in the packet mode and a page is transmitted thereto to alert the mobile station of a pending circuit-switched call, the amount of time required to changeover the mode of operation of the mobile station into the circuit-switched mode is reduced relative to conventional manners by which changeover is effectuated. By improving the page response time of the mobile station, improved communication system functioning is possible as the time required to changeover the mode of operation of the mobile station and thereafter effectuate circuit-switched communication is reduced.

In one aspect of the present invention, apparatus, and an associated method, is provided to facilitate the changeover of the mode of operation of the mobile station out of a packet mode, and into a circuit-switched mode, when a circuit-switched call is to be terminated at the mobile station.

In another aspect of the present invention, apparatus, and an associated method, is provided for the network infrastructure of the cellular, or other radio, communication system. When a circuit-switched call is to be terminated at a mobile station, the mobile station is first paged to alert the mobile station of the pending circuit-switched call. Through operation of an embodiment of the present invention, the page is formatted to include a time allocation, allocating a time period during which the mobile station is to reply to the page. When the page is detected at the mobile station, the mobile station utilizes the time period allocation contained therein to determine when a reply to the page is to be returned to the network infrastructure.

In an exemplary implementation in which the radio communication system is formed of a GSM cellular communication system, the page generated by the network infrastructure forms a packet paging request which includes a RRBP1 (Relative Reserved Block Period) field. The time period allocated to the mobile station to reply to the page is contained in the RRBP1 field. Allocation of the time period is allocated by an allocator which forms a portion of the network infrastructure, and indications of the allocated time period are inserted into the RRBP1 field during formatting of the page request. Once the page is formed, the page is transmitted upon a radio link to the mobile station to be detected thereat.

In another aspect of the present invention, apparatus, and an associated method, is provided for the mobile station operable in the cellular, or other radio, communication system. Through operation of an embodiment of the present invention, the mobile station detects the page transmitted thereto to alert the mobile station of the pendency of the circuit-switched call. When the mobile station is being operated in the packet mode when the page is detected, the mobile station must be changed over to the circuit-switched mode to permit the effectuation of the circuit-switched call. The time period allocation is extracted from the page and indications of the extracted information are used to select when a response is made to the page.

In an exemplary implementation in which the mobile station forms a GSM mobile station and the radio communication system comprises a GSM cellular communication system, the page transmitted to the mobile station to alert the mobile station of the circuit-switched call forms a packet paging request. The packet paging request includes a RRBP1 (Relative Reserved Block Period) field which contains the time allocation information. An extractor extracts from packet paging request the time allocation information from the RRBP1 field of the message. Indications of the extracted information are provided to a packet channel request message generator. The packet channel request message generator generates a packet channel request message for transmission during the time periods allocated in the RRBP1 field of the packet paging request and extracted therefrom by the extractor. The packet channel request message is an inherent packet suspend request to be transmitted to the network infrastructure. Such transmission forms a mobile-originated suspend message. The message is transmitted upon a Random access Channel (RaCH). A random access channel inherently permits random access thereto resulting, generally, in uncertainties in the availability of the channel pursuant to the page response and suspend message timing. By allocating time periods upon which to return the page response message to the network infrastructure, the uncertainties associated with utilizing the random access channel are reduced.

In these and other aspects, therefore, apparatus, and an associated method, is provided for the network infrastructure of a radio communication system having a mobile station with which communications are effectuable by way of a radio link. The mobile station is operable in a first communication mode and a second communication mode. Reassignment of the mobile station out of the first communication mode and into the second communication mode is facilitated. An allocator is coupled to receive indications of communications to be effectuated with the mobile station necessitating operation of the mobile station in the second communication mode. The allocator allocates a time period during which the mobile station is to generate a page response message. A page request message generator is coupled to receive the indications of communications to be effectuated with the mobile station and indications of the time period allocated by the allocator. The page request message generator generates a page request message for communication to the mobile station. The page request message includes the indications of the time period allocated by the allocator.

In these and other aspects, apparatus, and an associated method, is also provided for a mobile station operable in a radio communication system having network infrastructure with which communications are effectuable by way of a radio link. The mobile station is operable in a first communication mode and a second communication mode. Reassignment of the mobile station out of the first communication mode and into the second communication mode is facilitated. A page request message detector is coupled to receive indications of a page request message communicated to the mobile station by the network infrastructure. The page request message detector detects reception of the page request message at the mobile station. A time-period-allocation extractor is coupled to the page request message detector. The time-period-allocation extractor extracts from the indications of the page request message values representative of a time period allocated to the mobile station during which to respond with a page response message. A page response message generator generates the page response message during the time period identified by the time period extracted by the time-period-allocation extractor.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENT

Figure 1:
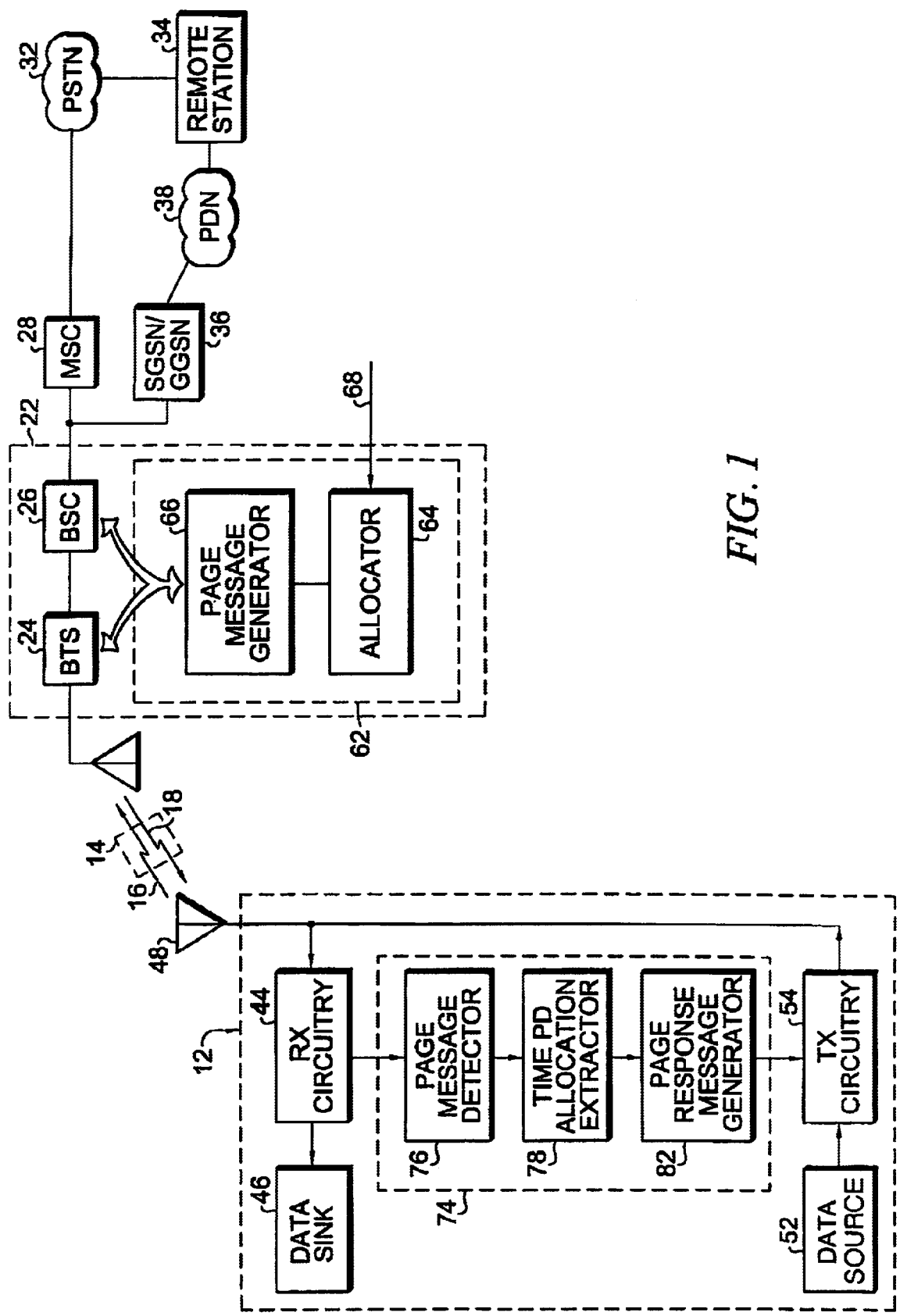
FIG. 1 illustrates a functional block diagram of a communication system in which an embodiment of the present invention is operable.

Referring first to FIG. 1, a communication system, shown generally at 10, provides for radio communication with a mobile station 12. In the exemplary implementation, the communication system 10 forms a GSM (Global System for Mobile communications) cellular communication system which provides for GPRS (General Packet Radio Service) messaging. Such an implementation is exemplary, and operation of an embodiment of the present invention is operable in other types of cellular, or other radio, communication systems in manners analogous to the manner of operation which shall be described herein below. That is to say, while operation of an embodiment of the present invention shall be described with respect to a GSM cellular communication system with GPRS, in other implementations, operation of an embodiment of the present invention can analogously be described with respect to its implementation in another type of communication system.

Radio communications with the mobile station 12 are effectuated by way of a radio link 14, here shown to include a downlink, or forward link, path 16, and an uplink, or reverse link, path 18. Communication signals originated at the mobile station are communicated upon the uplink path 18 to the network infrastructure, formed of the elements shown at the right-hand side portion (as-shown) of the figure. And, communication signals to be terminated at the mobile station 12 are transmitted by the network infrastructure upon the downlink path 16 to be detected, and thereby terminated, at the mobile station.

Communication signals communicated between the network infrastructure and the mobile station are selectably, here, of two different types. Namely, circuit-switched communication signals can be communicated between the network infrastructure and the mobile station, and packet-switched communication signals can also be communicated between the network infrastructure and the mobile station.

The network infrastructure portion of the communication system is here shown to include a Base Station System (BSS). The Base Station System 22 includes a Base Transceiver Station (BTS) 24 and a Base Station Controller (BSC) 26. The Base Transceiver Station includes transceiver circuitry for generating, and receiving, radio-frequency signals to be terminated at, or originated at, respectively, the mobile station. The base station controller is operable to control operation of one or more base transceiver stations.

The base station system is coupled to a Mobile Switching Center (MSC) 28 which, in turn, is coupled to a Public-Switched, Telephonic Network (PSTN) 32. The network 32 is coupled to a remote station 34. Circuit-switched communications are effectable between the remote station 34 and the mobile station 12 through the formation of a communication path formed to extend through the public-switched, telephonic network, the mobile switching center, the base station system, and the radio link. Upon formation of the communication path, circuit-switched communications between the mobile station and the remote station are effectuable.

The base station system is further coupled to a serving GPRS Support Node/Gateway GPRS Support Node (SGSN/GGSN) 36 which, in turn, is coupled to a Packet Data Network (PDN). The packet data network is representative of, for instance, the Internet. The remote station 34 is here also operable to send, and to receive, packet-formatted messages. Thereby, packet-formatted data, here forming a GPRS packet data message, can be communicated between the remote station and the mobile station. For instance, a packet-formatted message originated at the remote station 34 to be communicated to the mobile station 12 is first routed to the GGSN 36 by way of the packet data network, the SGSN, the base station system formed of the BSC and the BTS, and the radio link to the mobile station. A GPRS packet data message originated at the mobile station, conversely, is routed, by way of the radio link 14, through the base station system, the SGSN, and the GPRS packet data network to the GGSN and, then to the remote station by way of the packet data network.

The mobile station 12 is here shown to include both a receive portion and a transmit portion. Here, the receive portion of the mobile station includes receive circuitry 44 and a data sink 46. Communication signals transmitted by the network infrastructure upon the downlink path 16 are transduced into electrical form by the antenna transducer 48 and, thereafter, provided to the receive circuitry 44 of the mobile station.

The transmit portion of the mobile station is here shown to include a data source 52 and transmit circuitry 54. Data originated at, or provided to, the data source 52 is converted into transmit form by the transmit circuitry 54 and then provided to the antenna transducer 48. The antenna transducer is operable to convert, into electromagnetic form, the transmit signals provided thereto to permit transmission of such transmit signals upon the radio link 14.

As noted above, the mobile station 12 is operated in a packet mode when the mobile station is operable to communicate packet-formatted data. And, the mobile station is operated in a circuit-switched mode when the mobile station is to communicate circuit-switched data. When the mobile station is in the packet mode and a circuit-switched call is to be terminated thereat, the mobile station must be changed over into the circuit-switched mode to permit effectuation of a circuit-switched communication service of which the circuit-switched call is formed. Operation of an embodiment of the present invention improves the speed at which the mobile station can be changed out of the packet mode and into the circuit-switched mode.

Pursuant to an embodiment of the present invention, the base station system 22 further includes apparatus 62 formed of the elements within the block, shown in dash. The elements are functional in nature and are embodied at the base transceiver station 24 or the base station controller 26, or distributed therebetween. The apparatus 62 is here shown to include an allocator 64 and a page message generator 66. The allocator 64 is coupled to receive an input signal on the line 68 when a circuit-switched call is to be terminated at the mobile station. Other indications, such as indications of other communications ongoing, or proposed to be ongoing, in the communication system can also be provided to the allocator. The allocator is operable to allocate a portion of a random access channel during which the mobile station is to return a page response message. In the exemplary implementation, a random access channel is divided into frames, and one or more selected frames is allocated for communication thereon by the mobile station of the page response message.

Indications of allocations made by the allocator are provided to the page message generator 66. The page message generator is operable to generate a page message to be transmitted to the mobile station to alert the mobile station of the circuit-switched call to be terminated thereat. In the exemplary implementation in which the communication system forms a GSM system, the format of the page message is set forth in the appropriate GSM standard specification. The standard format of the page message defined in the standard specification includes a RRBP1 (Relative Reserve Block Period) field. Indications of the allocation made by the allocator, in the exemplary implementation, is inserted into this field.

The following indicates the packet paging request message in the exemplary implementation in which GPRS (General Packet Radio Service) is enhanced to include timing information formed by the allocator to direct the mobile station when to generate a packet page response. The following message content utilizes CSN1 notation:

```
<Packet paging Request message content>::=
<Page mode : bit (2)>
{0 | 1<Persistence level : bit (4)>*4}
{0 | 1<NLN :bit(2).}
{{1<Repeated Page info : <Repeated Page information struct>>}**0
    <padding bits>}
!<Distribution part error : bit(*) = <no string>>
<Repeated page info struct>::=
{0    -- page request for TBF establishment TO BE LEFT AS IT IS
{0<PTSM|:bit(32)>
|1<Length of mobile identity contents: bit(4)>
    <Mobile identity: octet (val(Length of mobile identity contents))>}
|1    - Page request for RR conn. establishment - MODIFIED
{0<TMS|: bit(32)>
|1<Length of mobile identity: contents: bit (4)>
    <Channel needed : bit(2)>
{1<eMLPP_PRIORITY : bit(3)>
|01<RRBP1 : bit(2)> NEW OPTIONAL FIELD*
|00}
```

The page message generated by the generator 66 is provided to the transmit circuitry of the base transceiver station 24 to be sent upon the radio link 14 to the mobile station. Thereby, the mobile station is provided with the indication that the circuit-switched call is to be terminated at the mobile station and with instructions to the mobile station as to when to respond with a reply message thereto.

The mobile station 12 also includes apparatus 74 of an embodiment of the present invention. The apparatus 74 is formed of functional elements within the block, shown in dash. In the exemplary implementation, at least portions of the apparatus 74 are embodied as algorithms executed by control circuitry of the mobile station. Here, the apparatus 74 includes a page message detector 76, a time period allocation extractor 78, and a page response message generator 82.

The page message detector 76 is coupled to the receive circuitry 44 and is operable to detect page messages received at the mobile station, namely, here, the page message transmitted by the network infrastructure to the mobile station to alert the mobile station of the forthcoming circuit-switched call.

The extractor 78 is coupled to the page message detector and is operable to extract from the page message detected by the detector 76 values indicative of the time period allocations contained in the RRBP1 field of the detected page message. Indications thereof are provided to the page message generator 82 which is coupled to the extractor. In the exemplary implementation, the RaCH is divided into frames J. One or more frames, J, J+1, J+2, . . . are contained in the RRBP1 field and identified during when the response to the page is to be transmitted by the mobile station.

The page response message generator 82 is operable to generate a page response message for transmission during the time period allocated by the allocator 64. The page response message generated by the generator 82 is provided to the transmit circuitry 54 of the mobile station and thereafter transmitted back to the network infrastructure.

Figure 2:
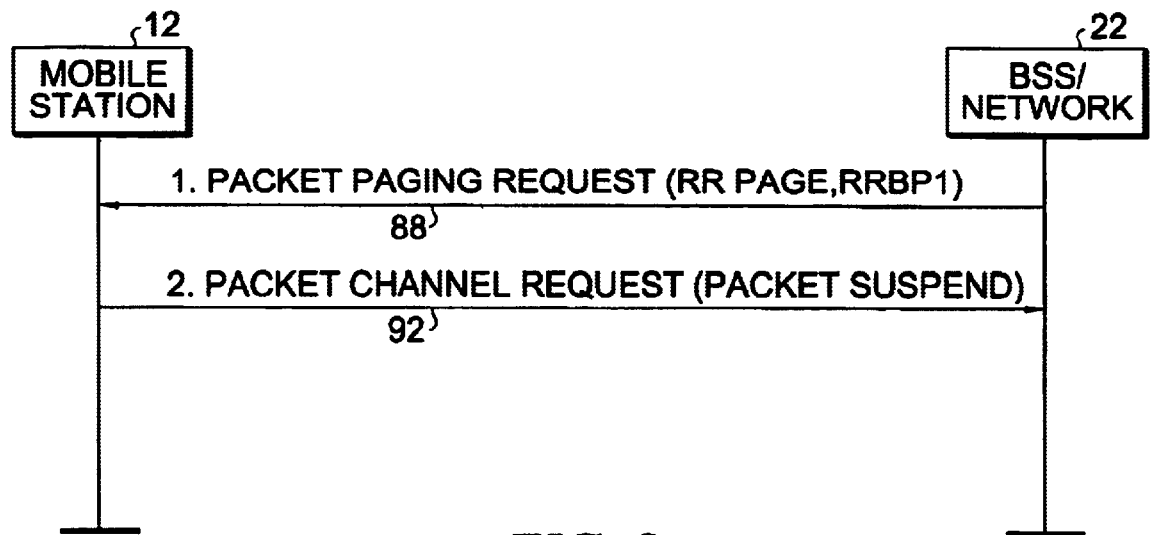
FIG. 2 illustrates a message sequence diagram representing the signaling between the network infrastructure and the mobile station of the communication system shown in FIG. 1 during operation of an embodiment of the present invention.

FIG. 2 illustrates a message sequence diagram, shown generally at 86, which illustrates signals generated during operation of an embodiment of the present invention. The signals indicated in the message sequence diagram are generated pursuant to an embodiment of the present invention by which to facilitate changeover of the mode of operation of the mobile station out of the packet mode and into a circuit-switched mode, thereby to be operable pursuant to circuit-switched communications.

The message sequence diagram 86 is representative of signaling generated when a circuit-switched call is to be terminated at the mobile station and the mobile station is in the packet mode. Changeover of the mobile station out of the packet mode and into the circuit-switched mode is required to permit termination of the circuit-switched call, or other communication session, at the mobile station. First, and as indicated by the segment 88, a packet paging request is transmitted by the network infrastructure, here the base station system, to the mobile station. The packet paging request, in the exemplary implementation in which the communication system is formed of a GSM communication system, includes a RRBP1 field which is of values indicative of an allocated time period during which the mobile station is to generate a response to the message.

When detected at the mobile station, the information contained in the RRBP1 field is extracted therefrom and utilized in the generation of a packet channel request, indicated by the segment 92. The signal generated, as indicated by the segment 92, is a packet channel request which forms an inherent suspend message. Thereby, by the transmission of a single message, steps required to changeover the mode of operation of the mobile station out of the packet mode and into the circuit-switched mode is facilitated.

Figure 3:
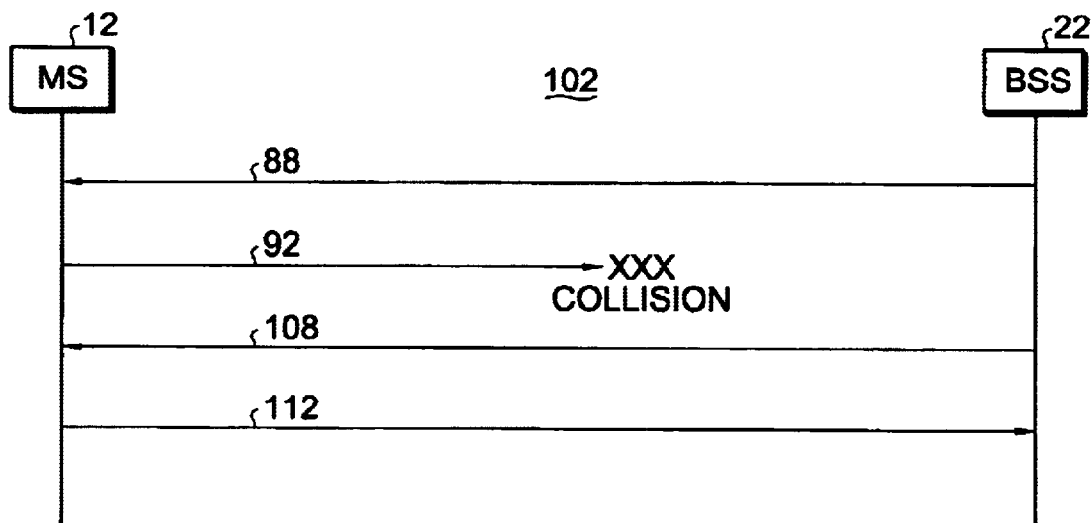
FIG. 3 illustrates another message sequence diagram also representative of signaling between the network infrastructure and the mobile station of the communication system shown in FIG. 1 during further operation of an embodiment of the present invention.

FIG. 3 illustrates a message sequence diagram, shown generally at 102, also representative of signaling generated during operation of an embodiment of the present invention. Here, the segments 88 and 92, described previously with respect to FIG. 2, are again shown. Here, though, the message 82 collides with another message transmitted on the RaCH and is not delivered to the network infrastructure. If a selected time period times out without detection at the network infrastructure of the message 92, the packet paging request is resent, here indicated by the segment 108. Upon detection at the mobile station of the message 108, a packet channel request is returned, again during the allocated time period contained in the message 108. The message 112 again forms a packet channel request which forms an inherent suspend request, which is returned to the network infrastructure. In the exemplary implementation, in the event that the mobile station does not receive the message 108 during a selected period, such as a 52 multi-frame period, the mobile station determines that the previously-transmitted packet channel request message is successfully delivered to the network infrastructure.

Figure 4:
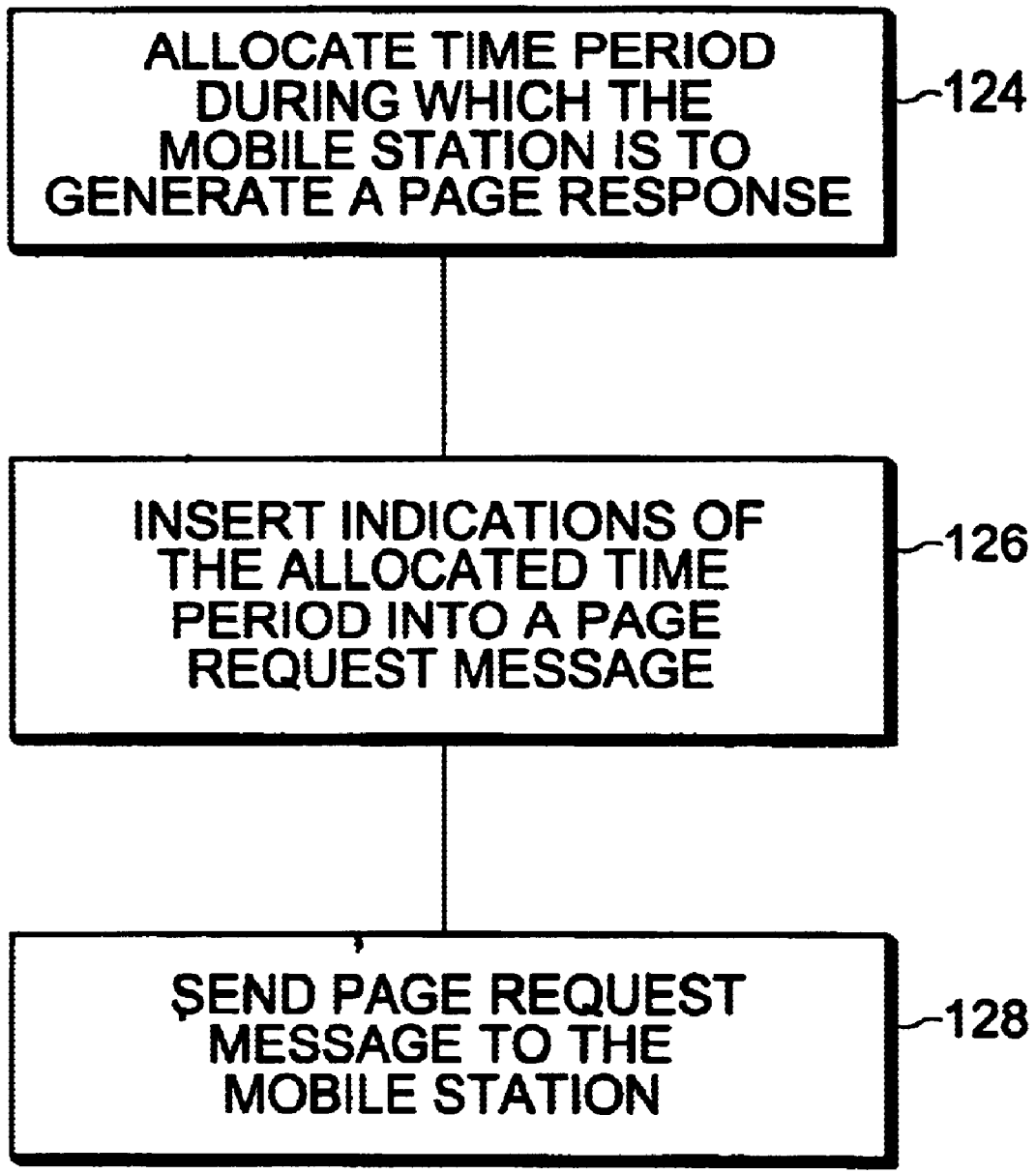
FIG. 4 illustrates a method flow diagram representing the method of operation of an embodiment of the present invention.

FIG. 4 illustrates a method, shown generally at 122, of an embodiment of the present invention. The method facilitates reassignment of a mobile station out of a packet-switched mode and into a circuit-switched mode of operation. First, and as indicated by the block 124, a time period during which the mobile station is to generate a page response message is allocated. Then, and as indicated by the block 126, indications of the allocated time period are inserted into a page request message. Then, and as indicated by the block 128, the page request message is sent to the mobile station.

Thereby, a manner is provided by which better to facilitate changeover of the mode of operation of the mobile station out of a packet mode and into a circuit-switched mode.

The preferred descriptions are of preferred examples for implementing the invention, and the scope of the invention should not necessarily be limited by this description. The scope of the present invention is defined by the following claims.

We claim:

1. In a radio communication system having a GSM (Global System for Mobile communications) cellular communication system that provides for both packet communications and circuit-switched communications, and that provides for a paging channel, the radio communication system having a mobile station and network infrastructure between which communications are effectuable by way of a radio link, the mobile station alternately operable in a packet communication mode and n circuit-switched communication mode, an improvement of apparatus far the network infrastructure for facilitating reassignment of the mobile station out of the packet communication mode and into the circuit-switched communication mode, said apparatus comprising:

an allocator coupled to receive indications of communications to be effectuated with the mobile station necessitating operation of the mobile station in the circuit-switched communication mode, said allocator for allocating a time period during which the mobile station is to generate a page response message;

and a page request message generator coupled to receive the indications of communications to be effectuated with the mobile station and indications of the time period allocated by said allocator, said page request message generator for generating a page request message for communication to the mobile station upon the paging channel, the page request message selectably including a multi-bit RRBP1 (Relative Reserve Block Period), field of digital value representative of the time period allocated by said allocator, the page request message for alerting the mobile station to commence reassignment thereof into the circuit-switched communication mode, the time period represented in terms of a frame reservation period.

2. The apparatus of claim 1 wherein the page response message to be generated during the time period allocated by said allocator comprises a packet channel request message.

3. The apparatus of claim 2, wherein the GSM cellular communication system defines a RaCH (Random access Channel) and wherein the page response message to be generated during the time period allocated by said allocator is to be generated upon the RaCH.

4. The apparatus of claim 3 wherein the RaCH is divided into successive time frames and wherein the time period allocated by said allocator comprises at least a selected frame of the successive frames.

5. In the radio communication system of claim 1, a further improvement of apparatus for the mobile station for facilitating the reassignment of the mobile station out of the packet communication mode and into the circuit-switched communication mode, said apparatus comprising:

a page request message detector coupled to receive indications of the page request message generated by said page request message generator subsequent to transmission thereof upon the radio link and reception thereof at the mobile station; and a time-period-allocation extractor coupled to said page request message detector, said time-period-allocation extractor for extracting from the indications of the page request message detected by said page request message detector values representative of the time period allocated by said allocator.

6. The apparatus of claim 5 further comprising a page response message generator coupled to said time-period-allocation extractor, said page response message generator for generating the page response message during the time period allocated by said allocator.

7. The apparatus of claim 6 wherein said time-period-allocation extractor extracts the values representative of the time period allocated by said allocator from the RRBP1 field of the packet paging message.

8. The apparatus of claim 7 wherein the GSM cellular communication system defines a RaCH (Random access Channel) and wherein said page response message generator generates the page response message upon the RaCH.

9. The apparatus of claim 8 wherein the RaCH is divided into successive frames, wherein the time period allocated by said allocator comprises at least a selected one of the successive frames into which the RaCH is divided.

10. The apparatus of claim 9 wherein said page request generator is further operable to resend the page request message if a selected time period passes without return of the page response message.

11. In a method for communicating in a radio communication system having a mobile station and network infrastructure between which communications are effectuable by way of a radio link in a packet communication mode and a circuit-switched communication mode, an improvement of a method for facilitating reassignment of the mobile station out of the packet communication mode and into the circuit-switched communication mode, said method comprising:

allocating a time period during which the mobile station is to generate a page response message;

inserting indications of the time period allocated during said step of allocating into a page request message;

sending the page request message to the mobile station;

detecting, while the mobile station is in the packet communication mode, the page message sent to the mobile station during said operation of sending;

extracting, while the mobile station is in the packet communication mode, values representative of the time period allocated during said operation of allocating during which to respond with a page response message; and generating, while the mobile station is in the packet communication mode, the page response message during the time period identified during said operation of extracting, the page response message also inherently forming a packet communication mode suspend message, thereby to facilitate, through a single page response, the reassignment of the mobile station out of the packet communication mode and into the circuit-switched communication mode.

12. The method of claim 11 wherein the radio communication system comprises a GSM (Global System for Mobile communications) cellular communication system which provides for both packet communications and circuit-switched communications, wherein the page request message comprises a RRBP1 (Relative Reserved Block Period) field, and wherein said operation of inserting comprises inserting the indications into the RRBP1 field.

13. The method of claim 11 comprising the additional operation of returning the page response message during the time period allocated during said operation of allocating.

14. In a radio communication system having a mobile station and network infrastructure between which communications are effectuable by way of a radio link in a packet communication mode and a circuit-switched communication mode, an improvement of apparatus for the mobile station for facilitating reassignment of the mobile station out of the packet communication mode and into the circuit-switched communication mode, said apparatus comprising:

a page request message detector coupled to receive indications of a page request message communicated to the mobile station by the network infrastructure while the mobile station is operated in the packet communication mode, said page request message detector for detecting reception of the page request message at the mobile station;

a time-period-allocation extractor coupled to said page request message detector, said time-period-allocation extractor for extracting, also while the mobile station is operated in the packet communication mode, from the indications of the page request message values representative of a time period allocated to the mobile station during which to respond with a page response message; and a page response message generator for generating, also while the mobile station is operated in the packet communication mode, the page response message during the time period identified by the time period extracted by said time-period-allocation extractor, the page response message also inherently forming a packet communication mode suspend message, thereby to facilitate, through a single page response, the reassignment of the mobile station out of the packet communication mode and into the circuit-switched mode.

\* \* \* \* \*